United States Patent Office 3,175,985
Patented Mar. 30, 1965

3,175,985
FOAMED POLYMERS AND PROCESS FOR PREPARING SAME
Gene E. Lightner, Moscow, Idaho, and Kenneth R. Nickolls, Wilbraham, Mass., assignors to Monsanto Company, a corporation of Delaware
No Drawing. Filed May 11, 1961, Ser. No. 109,240
6 Claims. (Cl. 260—2.5)

The present invention relates to foamable thermoplastic polymer compositions and to a process for preparing foamed thermoplastic polymers therefrom.

Foamable thermoplastic polymers constitute a valuable class of materials which are finding an increasingly wider application in the fabrication of numerous industrial and consumer articles. A conventional method currently used for fabricating foamed articles therefrom involves extruding thermoplastic polymer particles having incorporated therein a volatile aliphatic hydrocarbon as a foaming agent. The foaming agent is normally incorporated in the thermoplastic polymer particles at the time of manufacture of the polymer particles. This procedure has been found to be difficult, costly and time-consuming. The handling and storage of such foamable thermoplastic polymer particles, after manufacture, presents a potential fire hazard because of the volatile nature of the foaming agent. Further, because of its volatility, a portion of the foaming agent is frequently lost during storage. The loss of foaming agent leads to erratic results when the foamable thermoplastic polymer particles are extruded.

Thus, it is an object of this invention to provide novel foamable thermoplastic polymer compositions.

Another object of this invention is to provide an improved extrusion process for preparing foamed thermoplastic polymers.

Other objects and advantages of this invention will become apparent from the following detailed description thereof.

Briefly, according to this invention, the foregoing and other objects are attained by blending large thermoplastic polymer particles with finely-divided thermoplastic polymer particles having associated therewith a volatile organic foaming agent. The resulting compositions are dry and free-flowing and can be readily extruded to produce satisfactorily and uniformly foamed structures.

The following examples are set forth to illustrate more clearly the principle and practice of this invention to those skilled in the art. Unless otherwise specified, where parts are mentioned, they are parts by weight. Also, as used herein, "particle size," expressed in microns, refers to that dimension which is the largest of any given particle.

Example I

Twenty parts of finely-divided polystyrene particles, obtained by spray-drying a polystyrene latex and having an average particle size of about 0.01–1 micron, are charged to a water-cooled ribbon blender. The blender is started and 8 parts of commercial pentane (B.P. 36° C.) are added to the dried latex particles in small increments over a period of about 20–30 minutes. The resulting particles are free-flowing and dry to the touch. One hundred parts of polystyrene particles, having a particle size of about 700–1000 microns, and 1 part of calcium silicate having an average particle size of less than 5 microns, are added to the blender and mixed for about 20–30 minutes. The resulting product is a free-flowing uniform blend of the polystyrene particles and the dried polystyrene latex particles, which dried latex particles have the pentane associated therewith. The pentane constitutes about 6¼% by weight of the composition.

This resulting composition or blend is extruded at a rate of 35 lbs./hr. and at a die temperature of about 300° F. through a 1½" diameter single screw extruder which is fitted with a 3" wide sheet die having an opening of 0.04". The extruded foamed sheet has a density of about 3.1 lbs./ft.$^3$ and a fine cell size with the majority of the cells having a diameter in the range of about 0.01–0.03".

Example II

Example I is repeated with the exception that the polystyrene particles, the finely-divided dried polystyrene latex particles and the calcium silicate are first blended together and the pentane is then added thereto. The resulting composition is free-flowing and can be extruded under the same conditions specified in Example I. The extruded foamed sheet has substantially identical properties.

Example III

Example I is repeated except that 7.2 parts of pentane are first blended with 0.8 part of acetone and this blend is employed therein in place of the pentane. This foaming agent is added to the dried latex particles over a period of 10–15 minutes. The latex particles are free-flowing and dry to the touch. The polystyrene particles are then blended with the latex particles.

The resulting composition is extruded under the same conditions specified in Example I with the resulting extruded foamed sheet having substantially identical properties.

Example IV

Example III is repeated except that finely-divided polyvinyl chloride particles, obtained by spray-drying a polyvinyl chloride latex and having an average particle size of about 0.1–2 microns in diameter, are employed therein in place of the dried polystyrene latex particles, and suspension polymerized polyvinyl chloride particles, having a particle size of about 700–1000 microns in diameter, are employed in lieu of the large polystyrene particles. The resulting composition can be extruded to obtain a foamed sheet of polyvinyl chloride.

Example V

Example IV is repeated with the exception of styrene-acrylonitrile interpolymer particles being employed therein in place of the suspension polymerized polyvinyl chloride particles. The styrene-acrylonitrile interpolymer particles have an average particle size of about 700–1000 microns. The resulting compositon after blending under the conditions and in the proportions described in Example IV can be extruded under similar conditions.

The foamable thermoplastic polymer compositions of this invention comprise a free-flowing uniform blend of (a) large thermoplastic polymer particles having an average particle size of at least 500 microns, and (b) finely-divided thermoplastic polymer particles having an average particle size of less than 100 microns. The finely-divided thermoplastic polymer particles have associated therewith about 10–50% by weight of a volatile organic foaming agent. The proportions of the large thermoplastic polymer particles and the finely-divided thermoplastic polymer particles included in the compositions of this invention are such that the compositions contain 5–12% by weight of the volatile organic foaming agent.

A critical feature of this invention resides in the average particle size of the two groups of polymer particles employed therein. The large polymer particles have an average particle size of at least 500 microns and preferably an average particle size in the range of about 700–1500 and more especially 700–1000 microns. Particles of this size offer the advantages of being easily handled, extruding well and presenting a minimum of hazards usually associated with dusting.

The finely-divided polymer particles have an average particle size of less than 100 microns and preferably less than 5 microns, e.g., from 0.01 to 5.0 microns. In a preferred embodiment of this invention, the finely-divided polymer particles are dried latex particles as obtained by spray-drying a polymer latex. The polymer particles, because of their small particle size, can readily take up and hold (by adsorption on the particles' surfaces and/or by diffusion into the particles) a volatile organic foaming agent (subsequently described) in the amount of about 10–50% by weight and preferably 30–50% by weight of the polymer particles. It is a preferred practice to have the maximum quantity of the volatile organic foaming agent associated with the finely-divided polymer particles as is consistent with maintaining the polymer particles in a free-flowing condition that is dry to the touch.

In the compositions of this invention the large polymer particles and the finely-divided polymer particles, having the volatile foaming agent associated therewith, are intimately admixed in such proportions that the compositions contain 5–12% and preferably 7–10% by weight of the foaming agent. When the compositions are extruded, a homogeneous melt is obtained in which the foaming agent is uniformly distributed throughout the melted polymer.

The foamable thermoplastic polymer compositions of this invention are preferably prepared by first blending the finely-divided thermoplastic polymer particles with the volatile organic foaming agent. Because of the size of the discrete particles, they are able to quickly pick up the volatile organic foaming agent, as described previously. The resulting particles are thereby dry and free-flowing. These particles are subsequently blended with the large thermoplastic polymer particles to produce a uniform blend of the two materials.

In another embodiment of this invention, the large thermoplastic polymer particles, the finely-divided thermoplastic polymer particles and the volatile organic foaming agent may be simultaneously blended together. Alternatively, the volatile organic foaming agent may be blended with a previously prepared blend of the large thermoplastic polymer particles and the finely-divided thermoplastic polymer particles. In either of these two alternative embodiments, the volatile organic foaming agent preferentially associates itself with the finely-divided thermoplastic polymer particles.

The thermoplastic polymers, which can be employed either in the form of large polymer particles or as finely-divided polymer particles, are cellulose ethers and esters, e.g., ethyl cellulose, cellulose acetate, cellulose nitrate, cellulose butyrate; homopolymers and interpolymers of monomeric compounds containing the vinylidene group $CH_2=C<$ such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, methacrylic acid, acrylic acid and methacrylic acid esters of alcohols containing 1–18 carbon atoms such as methyl and ethyl methacrylate, acrylamide, methacrylamide, methacrylonitrile, acrylonitrile; vinyl aromatic compounds, e.g., styrene, alpha-methylstyrene, vinyl toluene, p-ethylstyrene, 2,4-dimethylstyrene, o-chlorostyrene, 2,5-dichlorostyrene, vinyl naphthalene and interpolymers of vinylidene monomers of the above type with alpha, beta-unsaturated polycarboxylic acids and derivatives thereof, e.g., maleic anhydride, diethyl maleate, dibutyl fumarate, etc. It is feasible and in some cases desirable to employ blends of two or more thermoplastic materials such as blends of styrene polymers with rubbery diene polymers such as natural rubber, butadiene-styrene interpolymers, butadiene-acrylonitrile interpolymers and the like. Styrene graft copolymers prepared by polymerizing monomeric styrene, either alone or in admixture with other vinylidene monomers such as acrylonitrile, in the presence of a rubbery diene polymer may also be employed advantageously. The preferred polymers are styrene homopolymers and interpolymers of styrene containing at least 50% and preferably at least 70% by weight of styrene and up to 50% and preferably up to 30% by weight of at least one vinylidene monomer interpolymerizable therewith, e.g., butadiene, acrylonitrile, alpha-methylstyrene and the like.

Although it is possible to employ mixtures of different polymer types in the compositions of this invention, it is preferred that the large thermoplastic polymer particles and the finely-divided thermoplastic polymer particles be essentially similar or identical in chemical composition. Where mixtures of different types of polymers are included in the compositions, it is desirable that the polymers be compatible with each other. By compatible is meant that the polymers can be blended together to form a homogeneous single phase solid. A typical compatible blend is a blend of a styrene-acrylonitrile interpolymer and polyvinyl chloride.

The foaming agent employed in the practice of this invention is a volatile non-reactive organic compound having an atmospheric boiling point in the range of about $-10°$ C. to about 80° C. and having, at most, a slight solvent action on the thermoplastic polymer particles included in the compositions of this invention. Examples of volatile nonreactive organic compounds which can be employed as a foaming agent are the aliphatic hydrocarbons such as butane, isobutane, pentane, hexane, isohexane, cyclohexane, etc.; certain halogenated aliphatic hydrocarbons such as ethyl chloride, propyl chloride, butyl chloride, isopropyl bromide and particularly the perchlorofluorocarbons such as dichlorodifluoromethane, monochlorotrifluoromethane, trichloromonfluoromethane, 1,1,-2,2-tetrachloro-1,2-difluoroethane, and the corresponding perchlorofluorocarbons as set forth in U.S. 2,848,428; aliphatic amines such as ethylamine, propylamine, ispropylamine, butylamine, dimethylamine, diethylamine, etc.; aliphatic ethers such as diethyl ether, diisopropyl ether, methyl ethyl ether, ethyl isopropyl ether, etc.; acetaldehyde, etc. For a listing of other volatile organic foaming agents that can be employed see U.S. 2,681,321.

It is feasible and in some cases desirable to employ mixtures as the volatile organic foaming agent wherein the mixtures consist predominantly of a volatile non-reactive organic foaming agent of the type described above with minor amounts of an organic compound having a solvent action on the thermoplastic polymer particles included in the compositions of this invention. Typically, such mixtures will contain 70–99% by weight of the volatile non-reactive organic foaming agent and, correspondingly, 30–1% by weight of the organic compound having a solvent action on the thermoplastic polymer particles. Typical of the organic compounds having such a solvent action and which can be employed in admixture with a volatile non-reactive organic foaming agent are acetone, methylene chloride, styrene monomer, benzene, xylene, carbon tetrachloride, chloroform, etc. Preferably, the organic solvent should have a boiling point not higher than about 80° C. The preferred foaming agent employed in the practice of this invention is a mixture of about 85–95% and preferably about 90% pentane and, correspondingly, about 15–5% and preferably about 10% acetone on a weight basis.

The extrusion process of this invention is conventional except for the foamable thermoplastic polymer composition employed therein. For example, the extrusion process may be carried out in a continuous screw extruder at temperatures ranging from 250° F. to about 400° F. with the most uniform material being obtained by extruding at temperatures of 280–310° F. The material may be extruded through dies of any desired configuration into open or closed molds or into open air. The pressure within the die should be greater than about 150 p.s.i. gauge to prevent premature foaming within the apparatus.

The advantages of this invention are found in the ability of the finely-divided thermoplastic polymer particles to pick up or absorb in a relatively short period of time the volatile organic foaming agent. Thus, the said foaming agent can be incorporated with the finely-divided thermoplastic polymer particles and the large thermoplastic polymer particles to produce a foamable thermoplastic polymer composition just prior to extrusion. This in turn reduces potential fire hazard and loss of foaming agent. Extrusion results can then be closely controlled so as to insure a uniform and satisfactory extruded product.

It will thus be seen that the objects set forth above, among those made apparent from the preceding description, are efficiently attained, and since certain changes may be made in carrying out the above process and in the composition set forth without departing from the scope of the invention, it is intended that all matters contained in the above description shall be interpreted as illustrative and not in a limiting sense.

What is claimed is:

1. A process for preparing a foamed thermoplastic polymer structure which comprises extruding a foamable thermoplastic polymer composition at a temperature of about 250–400° F. and an extrusion die pressure of about 150–3000 p.s.i.; said foamable thermoplastic polymer composition comprised of a free-flowing uniform blend of (a) large thermoplastic polymer particles having an average particle size of 700–1500 microns, and (b) finely-divided thermoplastic polymer particles having an average particle size of less than 100 microns and having associated therewith a volatile organic foaming agent in the amount of about 10–50% by weight; said volatile organic foaming agent being selected from the group consisting of (1) a non-reactive organic compound which has at most a slight solvent action on the large thermoplastic polymer particles and finely-divided thermoplastic polymer particles and has an atmospheric boiling point in the range of from about −10° C. to about 80° C. and (2) mixtures consisting of 70–99% by weight of (1) with, correspondingly, 30–1% by weight of an organic compound having a solvent action on the thermoplastic polymer particles employed therein; the proportions of (a) and (b) being such that the composition contains about 5–12% by weight of the volatile organic foaming agent.

2. A process as described in claim 1 wherein the large thermoplastic polymer particles and the finely-divided thermoplastic polymer particles are selected from the group consisting of styrene homopolymers and styrene interpolymers wherein the styrene interpolymers contain at least about 50% by weight of styrene and up to 50% by weight of at least one vinylidene monomer interpolymerized with styrene.

3. A process as described in claim 1 wherein the large thermoplastic polymer particles are a styrene-acrylonitrile interpolymer and the finely-divided thermoplastic polymer particles are a vinyl chloride homopolymer.

4. A process as described in claim 1 wherein the large thermoplastic polymer particles have an average particle size of 700–1000 microns and the finely-divided thermoplastic polymer particles have an average particle size of about 0.01–5 microns.

5. A process as described in claim 1 wherein the volatile organic foaming agent is pentane.

6. A process as described in claim 1 wherein the free-flowing uniform blend comprises (a) 100 parts by weight of styrene homopolymer particles having an average particle size of 700–1500 microns, and (b) 15–25 parts by weight of finely-divided styrene homopolymer particles having an average particle size of less than 100 microns and having associated therewith 6–12 parts by weight of a volatile organic foaming agent which consists of 70–99% by weight of pentane and, correspondingly, 30–1% by weight of acetone.

References Cited by the Examiner

UNITED STATES PATENTS

| 2,744,291 | 5/56 | Stastny et al. | 260—2.5 |
| 2,797,443 | 7/57 | Carlson | 260—2.5 |
| 2,888,410 | 5/59 | Buchholtz | 260—2.5 |
| 2,893,963 | 7/59 | Cleland | 260—2.5 |
| 2,950,261 | 8/60 | Buchholtz | 260—2.5 |

OTHER REFERENCES

Hohenstein et al.: "Journal of Polymer Science," volume 1, 1946, pages 131–136.

MURRAY TILLMAN, *Primary Examiner.*

LEON J. BERCOVITZ, *Examiner.*